3,611,716
GAS TURBINE WITH PLANETARY GEARS FOR HIGH OUTPUT IN MOTOR VEHICLES

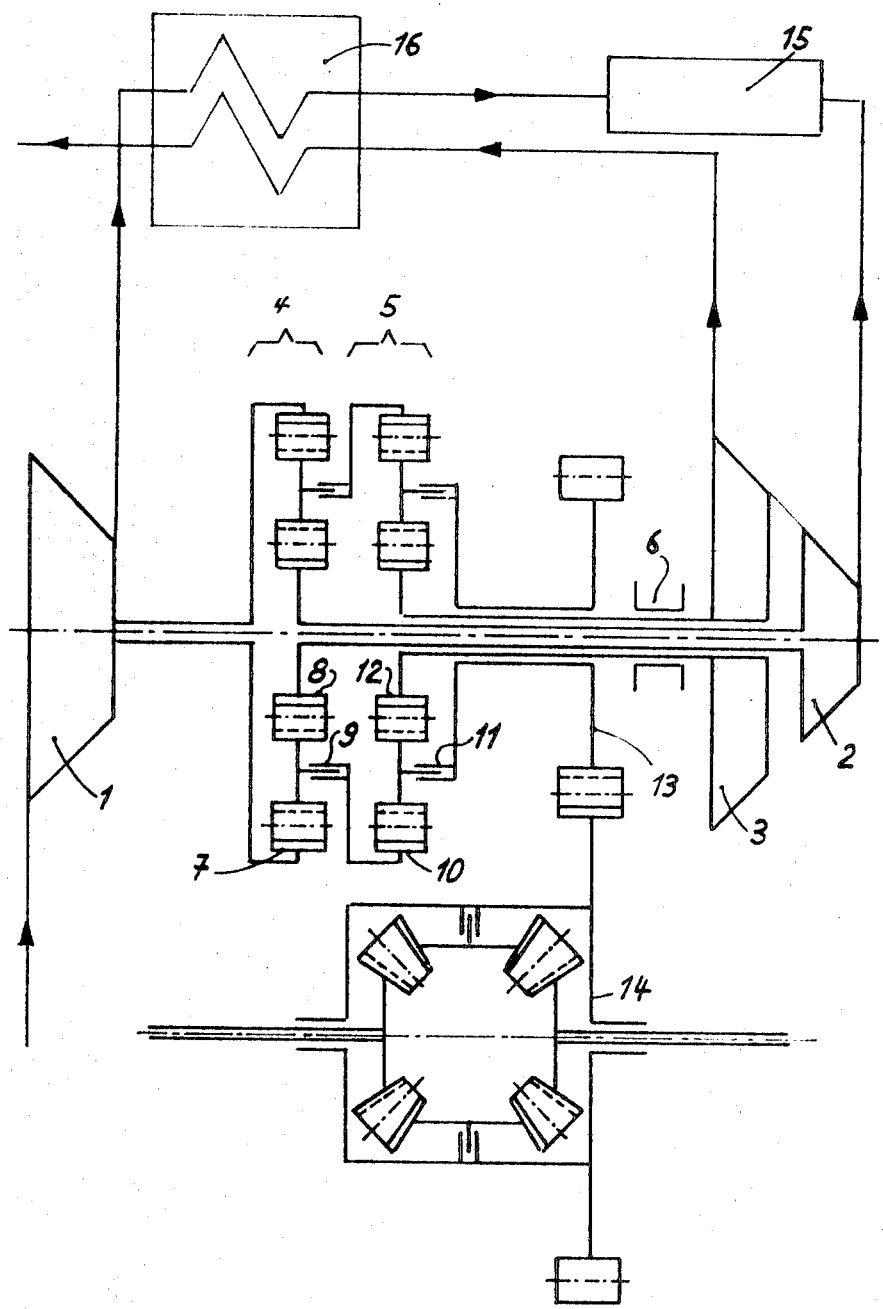

Riccardo Ferrari, Al Fossato, Giubiasco, Switzerland
Filed June 27, 1969, Ser. No. 837,114
Claims priority, application Switzerland, July 4, 1968,
10,233/68
Int. Cl. F02c 7/02, 7/10, 9/02
U.S. Cl. 60—39.16 C
3 Claims

ABSTRACT OF THE DISCLOSURE

A gas turbine arrangement for motor vehicles in which a compressor is connected to expansion stages through two planetary gears. The planetary gearing is arranged so that the expansion stages rotate in opposite directions relative to the rotational motion of the compressor.

---

The present invention relates to a gas turbine, whose power characteristics are in particular suitable for application in road vehicles.

Because of the unfavourable power curve characteristics of the gas turbine, it is so far necessary by the designer of present gas turbines to connect an automatic governor with the unit.

Further the exact adjustment of the dual expansion system presents specific problems, which hardly can be solved through a simple solution (in the dual expansion system the first expansion stage is driving the compressor, the second stage the power output shaft).

Since only the remaining power from the first stage can be used as output power, the efficiency of the "compressor-first expansion stage" group is in the medium torque range rather low.

The invention has the primary purpose to obtain a favourable power output curve through the use of planetary gear sets and as secondary purpose to improve the power output in the medium torque range.

An embodiment of a gas turbine according to the invention is illustrated in the attached schematic drawing.

A description of the working principle is given in the following:

On one end of the main shaft axis of the gas turbine is a one or multiple stage compressor 1 fitted, on the other end the first and second expansion stage (2 and 3), which are each connected with independent drive shafts. The three rotating elements in turn are connected with each other through two planetary gear sets 4 and 5.

During the starting operation, the compressor 1 is being driven by the ring gear 7 of the planetary set 4, which in turn is receiving the power from the first expansion stage 2 through sun gear 8 of the planetary set 4.

The two power torques (the negative one from the compressor and the positive one from the first expansion stage) accumulate and transmit the power through the carrier with the planetary gear 9 to the ring gear 10 of the second planetary set 5, which transmits the power over the carrier with planetary gears 11 to the power output gear 13, which is driving the differential gear 14 and through this the driving wheels of the vehicle.

The sun gear 12 of the planetary set 5 which is connected with the second expansion stage 3 cannot be rotated in the opposite direction as it would correspond to the reactory force, since the freewheeling or one way clutch system 6 prevents this movement.

Through this arrangement, the r.p.m.'s of the compressor can quickly be increased, since the full power of the first expansion stage 2 can be utilized with an initial effective power output.

Within the average r.p.m. range of the compressor 1 up to its maximum r.p.m. range, the second expansion stage 3 can transmit the excess power from the first expansion stage 2 over the sun gear 12 and the carrier with the planetary gears 11 of the planetary gear set 5 and through this increasing the r.p.m.'s of the power output gear 13 without reducing the transmitted torque.

Within the various types of load variation, which are characteristic for road vehicles, the arrangement reacts in a form that firstly the r.p.m.'s of the various groups and secondly the air stream which passes through the burning chamber 15 are adapted to the changing situations.

EXAMPLE

Under increasing load, the power output gear 13 is decreasing its r.p.m.'s; as a consequence the r.p.m.'s of the ring gear 7 of the planetary set 4 is increasing and through this the compressor 1. The compressor in turn is causing an increase of the torque which is transmitted to the power ouput gear 13 and at the same time creates an increase of the airflow through the burning chamber 15 and consequently through the expansion stages 2 and 3. These functions are required to compensate for the change in load and through this endeavour to bring the r.p.m.'s of the power output gear 13 back to the initial higher level.

Under decreasing load, the opposite process is taking place.

The shaft of the ring gear 7 of the first planetary set 4 can be used to drive the fuel injection pump, which in turn feeds burning chamber 15. The same shaft should accommodate a gear, which is used to start the turbine (through a starter or other device).

The control of the device could as an example be done through the use of a valve on the suction side of the compressor, connected with the regulator of the injection pump.

What is claimed is:

1. A gas turbine for motor vehicles comprising, in combination:
   (a) a gas turbine with first and second expansion stages;
   (b) compressor means;
   (c) a first planetary gear drive with sun gear and ring gear, said sun gear being driven by said first expansion stage, said ring gear driving said compressor means, the torques of said first expansion stage and said compressor means combining, said compressor means rotating opposite to the rotational direction of said expansion stages;
   (d) a planetary gear in said first planetary gear drive for transmitting the combined torque of said first expansion stage and said compressor means;
   (e) a second planetary gear drive with ring gear driven by said planetary gear in said first planetary gear drive and with sun gear connected to said second expansion stage;
   (f) a planetary gear in said second planetary gear drive for transmitting power from said second planetary gear drive; and
   (g) an output gear driven by said planetary gear in said second planetary gear drive and receiving said combined torques for transmitting the power to the wheels of said motor vehicle, all power from said expansion stages being transmitted to said compressor means when when said output gear is stationary, the speed of said compressor means decreasing with increase in speed of said output gear, the torque of said output gear being directly related to the torque of said compressor means and the speed of said output gear being inversely related to the speed of said compressor means, whereby variations in the speed of said output gear due to variations in load from said vehicle are compensated.

2. The gas turbine as defined in claim 1, including gas burning chamber means and head exchanger means connected to said expansion stages for operating said turbine said burning chamber means receiving gas from said compressor means and transmitting gas after burning to said expansion stages, said heat exchanger means being interposed between said compressor means and burning chamber means and receiving the exhaust from said expansion stages.

3. The gas turbine as defined in claim 2 including one-way clutch means coupled to said second stage for maintaining said sun gear of said second planetary gear drive rotating in one direction only.

References Cited

UNITED STATES PATENTS

| 3,237,404 | 3/1966 | Flanigan et al. | 60—39.16 |
| 3,286,543 | 11/1966 | Porter | 60—39.16 X |
| 3,287,903 | 11/1966 | Wickman | 60—39.16 |
| 3,368,347 | 2/1968 | Wickman | 60—39.16 |
| 3,488,947 | 1/1970 | Miller et al. | 60—39.16 |

MARK M. NEWMAN, Primary Examiner

U.S. Cl. X.R.

60—39.51 R